Oct. 25, 1949.     H. BUCCILLI     2,485,812
FISHING LEADER ASSEMBLY
Filed June 27, 1946
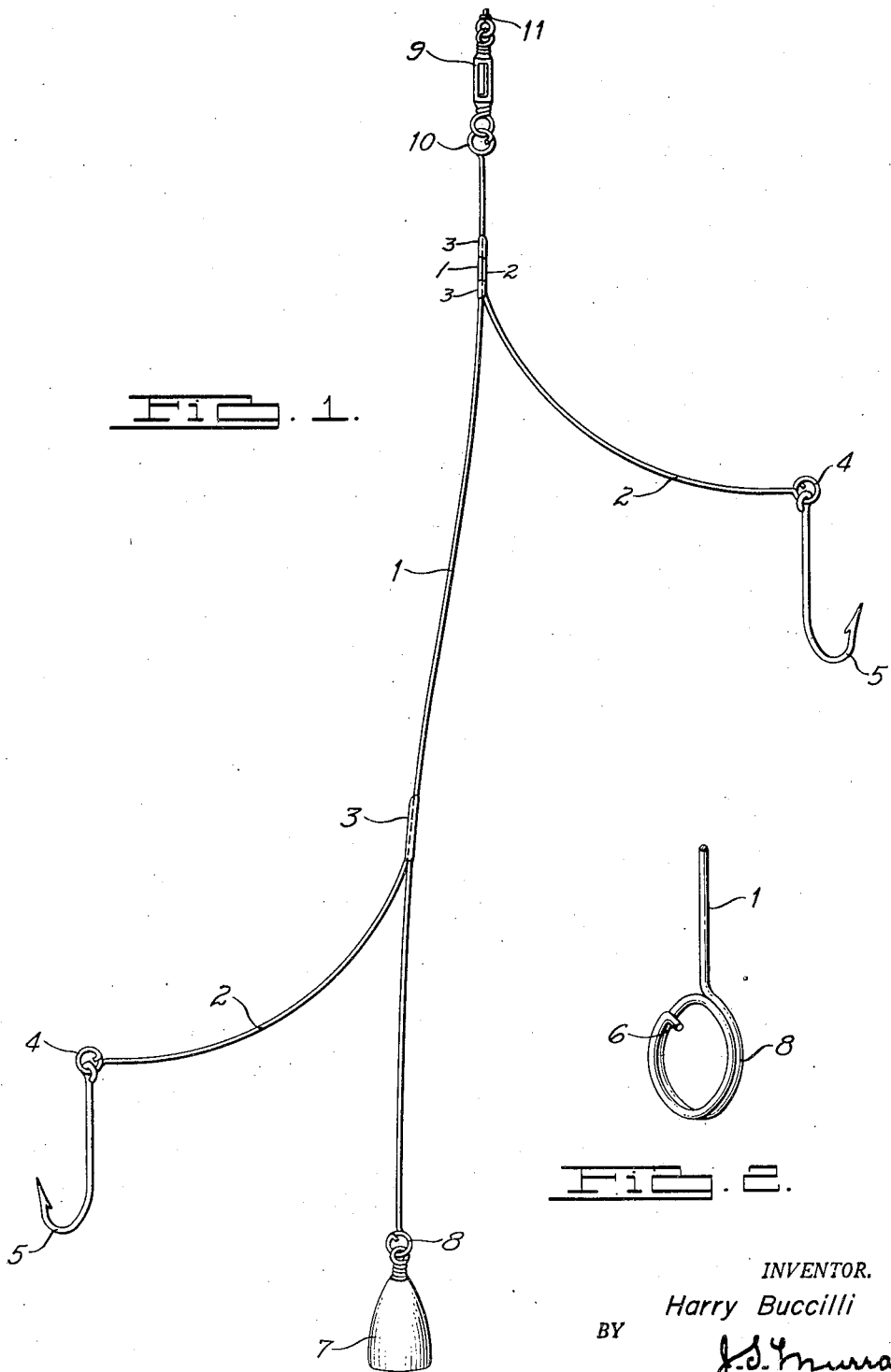
INVENTOR.
Harry Buccilli Patented Oct. 25, 1949

2,485,812

UNITED STATES PATENT OFFICE 2,485,812

FISHING LEADER ASSEMBLY

Harry Buccilli, Detroit, Mich.

Application June 27, 1946, Serial No. 679,697

1 Claim. (Cl. 43—28)

This invention relates to fishing leader assemblies and has for its primary object the provision of a wire leader resiliently resisting flexure from a straight or substantially straight form, in association with one or more snells also formed of resilient wire and of sufficient stiffness to materially resist deflection from a normal outstanding relation to the leader.

Another object is to provide a snell of a stiffness to normally maintain an outstanding relation to its supporting leader and of sufficient resiliency to return readily to such normal relation following any flexure.

These and various other objects are attained by the construction hereinafter described and illustrated in the accompanying drawing, wherein:

Fig. 1 is an elevational view of my improved leader assembly.

Fig. 2 is a perspective detail view of a connector used at several points in said assembly.

In these views, the reference character 1 designates a fishing leader formed of a fairly stiff yet highly resilient wire having connected to spaced intermediate points thereof snells or branch leaders 2 formed of the same material. It is vital to my purpose that rigid connections be established between the parts 1 and 2 and it is preferred to form such connections by soldering an end portion of each snell in a parallel and contiguous relation with the leader 1, as indicated at 3. The snells are so curved away from the leader that their free ends are well spaced from the leader and are at least approximately transverse to the leader. Each of said free ends is integrally formed with a connector 4 to carry a fish hook 5 and such connector has the nature of an eyelet formed preferably by approximately two convolutions of the wire with an end 6 projecting toward the eyelet axis. This projecting end may be readily engaged by the smaller eyelet of the fish hook, and such smaller eyelet may then be slipped around the convolutions until it embraces both thereof, as illustrated. The eyelet of a sinker 7 is similarly engaged with a connector 8 formed on the lower end of the leader and the eyelet of a swivel 9 is similarly engaged with a connector 10 formed upon the upper end of the leader. Thus any desired hook or sinker may be readily attached to or removed from the assembly and the assembly is quickly attachable to and removable from a fish line 11.

The primary advantage of the desired construction lies in the prevention of the snells from winding about the leader and of the hooks being caught on the leader. The described stiffness of both the leader and snells is a vital factor in deriving the specified advantage, but high flexibility of these parts is also essential so that they may yield to the pull of a fish and more easily clear obstructions in the water. The best material for my purpose is believed to be piano wire, by reason of its great strength, considerable stiffness, high flexibility, and rust-resisting properties.

Resiliency of the snells 2 not only assures their return to their illustrated normal positions, following any deflection, but also tends to engage the fish hook point in the mouth of a fish when the hook has been seized.

What I claim is:

A fishing leader assembly comprising an elongated leader formed by a single strand of highly resilient and freely flexible wire, a plurality of snells carried by and relatively spaced lengthwise of the leader, and each formed of a single strand of highly resilient and freely flexible wire, the snells having corresponding ends substantially parallel to and rigidly secured to the leader and being downwardly extended from said ends while normally diverging in curved form from the leader, their other ends being free and materially laterally spaced from the leader, and hooks respectively freely pivoted on the respective free ends of the snells.

HARRY BUCCILLI.

REFERENCES CITED

The following references are of record in the file of this patent:

UNITED STATES PATENTS

| Number | Name | Date |
|---|---|---|
| 13,649 | Johnson | Oct. 9, 1855 |
| 779,843 | Fredricks | Jan. 10, 1905 |
| 1,123,636 | Wiesenfeld | Jan. 5, 1915 |
| 1,451,656 | Halferty | Apr. 10, 1923 |
| 1,702,417 | Sandbo | Feb. 19, 1929 |
| 2,032,919 | Dantsizen | Mar. 3, 1936 |
| 2,162,739 | Mindek | June 20, 1939 |
| 2,392,147 | Hickson | Jan. 1, 1946 |

FOREIGN PATENTS

| Number | Country | Date |
|---|---|---|
| 6,922 | Great Britain | Mar. 16, 1897 |
| 523,887 | France | Apr. 30, 1921 |